(12) United States Patent
Brown et al.

(10) Patent No.: US 9,183,124 B2
(45) Date of Patent: Nov. 10, 2015

(54) AUTOMATION CONTROLLER FOR NEXT GENERATION TESTING SYSTEM

(75) Inventors: Julian M. Brown, London (GB); Peter J. Smith, London (GB); Stephen M. Williams, Warrington (GB); Jason A. Steele, London (GB)

(73) Assignee: Accenture Global Services Limited, Dublin (IR)

(*) Notice: Subject to any disclaimer, the term of this patent is extended or adjusted under 35 U.S.C. 154(b) by 351 days.

(21) Appl. No.: 13/446,311

(22) Filed: Apr. 13, 2012

(65) Prior Publication Data

US 2013/0104106 A1  Apr. 25, 2013

Related U.S. Application Data

(60) Provisional application No. 61/476,623, filed on Apr. 18, 2011.

(51) Int. Cl.
*G06F 11/36* (2006.01)

(52) U.S. Cl.
CPC ........... *G06F 11/3696* (2013.01); *G06F 11/36* (2013.01); *G06F 11/3668* (2013.01); *G06F 11/3672* (2013.01)

(58) Field of Classification Search
CPC .. G06F 11/36; G06F 11/3668; G06F 11/3696
USPC ........................................................ 717/124
See application file for complete search history.

(56) References Cited

U.S. PATENT DOCUMENTS

| | | | |
|---|---|---|---|
| 5,659,547 A | 8/1997 | Scarr et al. | |
| 2004/0098650 A1* | 5/2004 | Rajsuman | 714/742 |
| 2004/0181471 A1* | 9/2004 | Rogers | 705/31 |
| 2010/0229155 A1* | 9/2010 | Adiyapatham et al. | 717/124 |
| 2011/0035629 A1* | 2/2011 | Noller et al. | 714/38.14 |

FOREIGN PATENT DOCUMENTS

CN   101669114 A   3/2010

OTHER PUBLICATIONS

Australian Office Action dated Jun. 6, 2013, for co-pending Australian Patent Application No. 2012202188.
People's Republic of China Search Report for 2012/101270101 dated Apr. 18, 2012.

\* cited by examiner

*Primary Examiner* — Li B Zhen
*Assistant Examiner* — Viva Miller
(74) *Attorney, Agent, or Firm* — Brinks Gilson & Lione (57) ABSTRACT

An automation controller for next generation testing system includes a database including a plurality of scripts and modules, a business layer component, and an automation component. The automation component includes an automation agent and an automation worker. The business layer component is operable to determine a next script from the plurality of scripts and modules and send the next script to the automation component in response to a get next script request sent by the automation component. The automation agent is operable to send the get next script request to the business layer, receive the next script from the business layer, and send the next script to the automation worker for execution. The automation worker is operable to execute the next script or section thereof, obtain a result, send status updates, send proof of life notifications and the result of execution to the automation agent.

11 Claims, 9 Drawing Sheets

FIG. 9

AUTOMATION CONTROLLER FOR NEXT GENERATION TESTING SYSTEM

CLAIM OF PRIORITY

This application claims the benefit of U.S. Provisional Patent Application Ser. No. 61/476,623 filed Apr. 18, 2011, which is incorporated by reference in its entirety herein.

BACKGROUND OF THE INVENTION

1. Technical Field

This disclosure relates to software testing, and in particular, this disclosure relates to an automation controller for an integrated platform for developing, debugging, and executing tests to insure the integrity and functionality of software systems.

2. Background

The development of computer software involves a rigorous testing process to insure that the software functions as intended. During the testing process, testers write various test scripts or software test modules for performing different types of tests necessary to ensure that the computer software is functioning as designed. The testers also set up and run the test scripts while tracking the results, and report the test result to appropriate personnel. This process is inefficient and time consuming, and requires significant tester involvement.

Further, as businesses continue to rely on computer software and complex software packages, an increasing number of highly complex computer software has been developed to meet business demands. Due to the increased complexity and scale, such software programs require a large-scale testing process involving far more testers and test scripts than were required previously. Such increases are related to organizations centralizing their testing and moving to an outsourced testing model. Traditionally, testing was 'embedded' into the systems development life cycle (SDLC) for each project, but now central 'discrete' testing functions exist within organizations, which test across multiple projects and releases.

Testing tools have been developed to assist the testers in performing the various steps of the testing process. However, existing testing tools are not able to provide the required functionality and efficiency to overcome the challenges posed by the large-scale testing process.

Testing of various products and/or software products has increased in complexity and scope. In the past, relatively small groups of designers and developers, perhaps 10 to 30 in number, developed various tests for testing and verifying the function of software modules or code segments. Such small groups of individuals have been manageable. However, as the number of individuals contributing to the project becomes large, redundancy and complexity increase, which contributes to increased cost and an increase in the number of errors. Therefore, a need exists to address the above.

SUMMARY

An automation controller for next generation testing system includes a database including a plurality of scripts and modules, a business layer component, and an automation component. The automation component includes an automation agent and an automation worker. The business layer component is operable to determine a next script from the plurality of scripts and modules and send the next script to the automation component in response to a get next script request sent by the automation component. The automation agent is operable to send the get next script request to the business layer, receive the next script from the business layer, and send the next script to the automation worker for execution. The automation worker is operable to execute the next script or section thereof, obtain a result, and send status updates, proof of life notifications and the result of execution to the automation agent.

Other embodiments of systems, methods, features, and their corresponding advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and the description, in addition to the presentation sheets included in the appendix, which is incorporated herein in its entirety. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
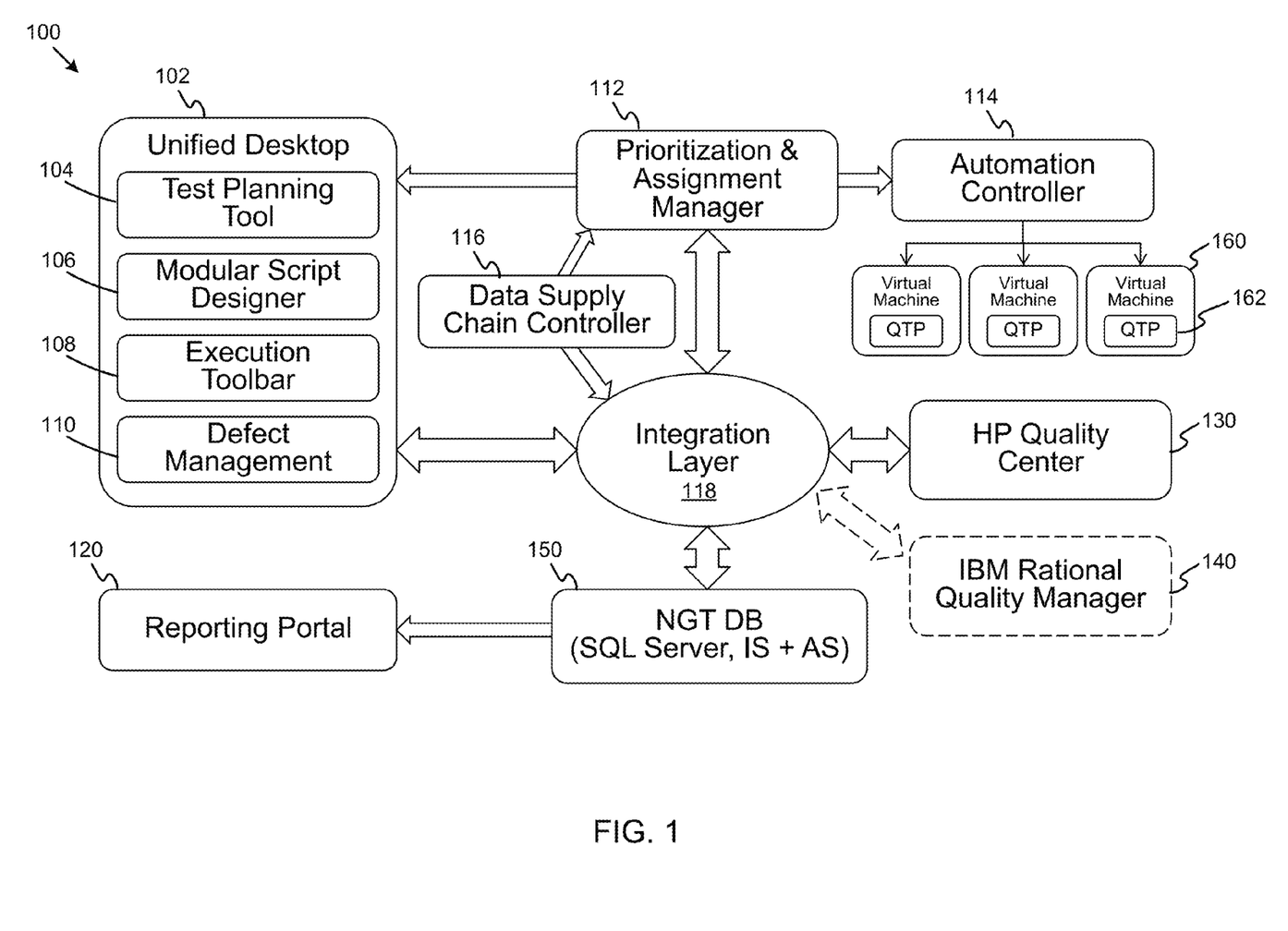
FIG. 1 shows an embodiment of a next generation testing ("NGT") system.

As shown in FIG. 1, a system 100 for next generation testing ("NGT system") using automation controller provides a platform allowing increased efficiency and functionality for testing computer software. The system 100 may be embodied as a system cooperating with computer hardware components and/or as a computer-implemented method.

The NGT system 100 may include a unified desktop 102 which includes a test planning tool 104, a modular script designer 106, an execution tool bar 108, and a defect management component 110. The NGT system 100 may also include a prioritization and assignment manager 112, an automation controller 114, a data supply chain controller 116, an integration layer 118, and a reporting portal 120. The integration layer may link to an existing testing tool 130, such as Hewlett Packard's HP Quality Center™, an existing test management and quality management tool 140, such as IBM Rational Quality Manager, and a database or server 150, such as a Microsoft SQL Server with SQL Integration Services and SQL Analysis Services. The NGT system 100 may also include virtual machines 160, which may interface with the automation controller 114. The virtual machines 160 may run a functional test automation tool 162, such as Hewlett Packard's HP QuickTest Professional (QTP), which is commercially available functional and regression test software. The automation controller 114, automation worker and automation agents may reside within virtual machines 160 ("VMs"). The virtual machines 160 may run a functional test automation tool, such as functional and regression test software 162, such as Hewlett Packard's HP QuickTest Professional (QTP). Other types of testing tools may also be used.

The NGT system 100 provides a suite of "wrapper" tools for a testing process. The NGT system 100 may include of a set of tools that integrate with existing test tools, and extend their functionality. The NGT system 100 allows functional testing at a larger scale by delivering tools to reduce the effort and increase the quality of testing. The NGT system 100 may reduce testing effort. Further the NGT system 100 may be extendible for use across clients and may be built as an internal set of assets for use across clients and may be designed to allow client specific functionality to be handled through configuration and extension.

Figure 2:
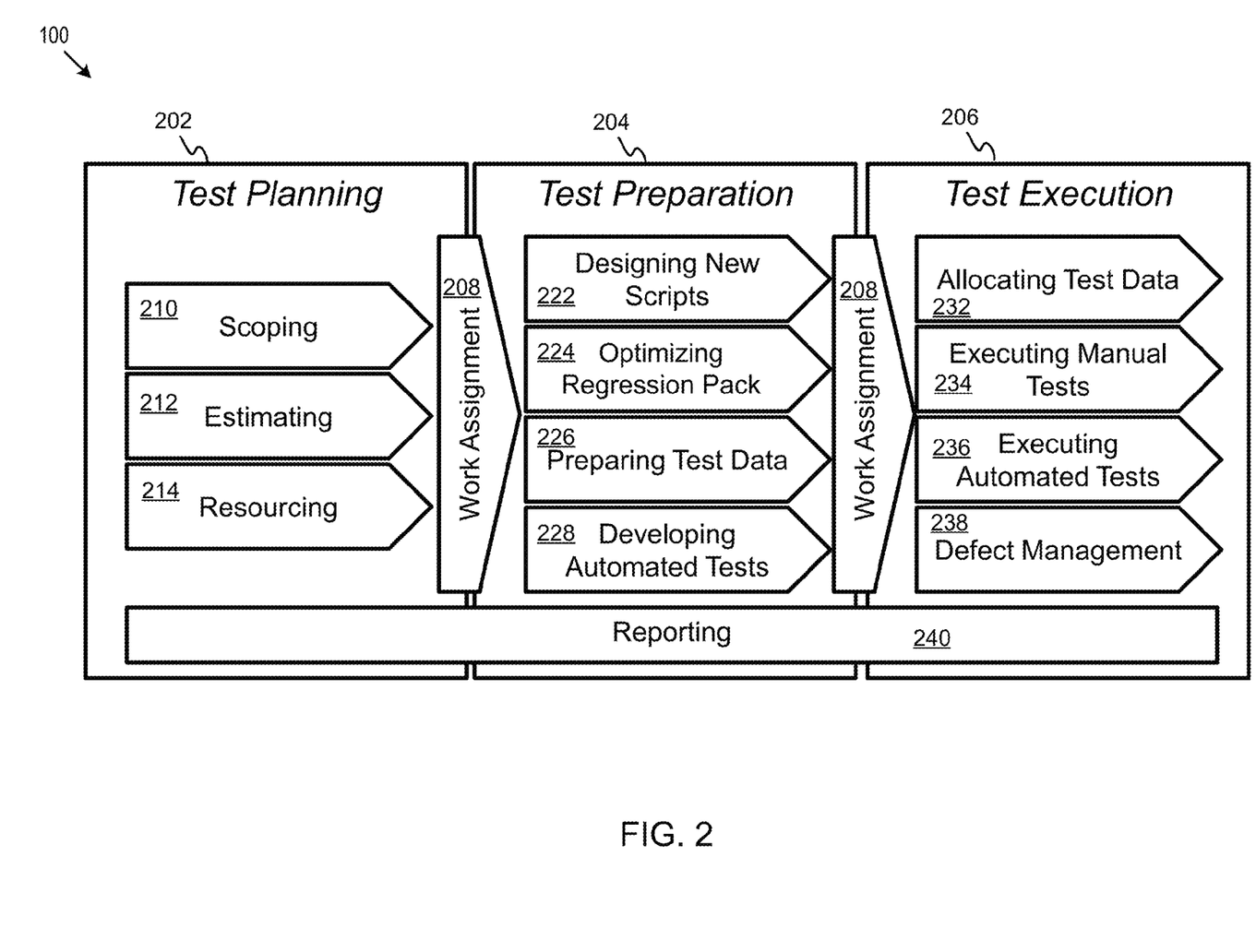
FIG. 2 is a diagram showing the overall testing process using the NGT system.

FIG. 2 is a diagram showing the overall testing process using the NGT system 100. The testing process may include a test planning stage 202, test preparation stage 204, and test execution stage 206. The NGT system 100 may provide increased efficiency and functionality across all areas of testing. Transitioning from the test planning stage 202 to the test preparation stage 204, and from the test preparation stage 204 to the test execution state 206 may involve work assignment 208. The test planning stage 202 may include scoping 210, estimating 212 and resourcing 214. The test preparation stage 204 may include designing new scripts 222, optimizing regression pack 224, preparing test data 226, developing and developing automated tests 228. The test execution stage 206 may include allocating test data 232, executing manual tests 234, executing automated tests 236, and defect management 238. The next generation testing system 100 may also include reporting capability 240 throughout all stages of the testing process.

Figure 3:
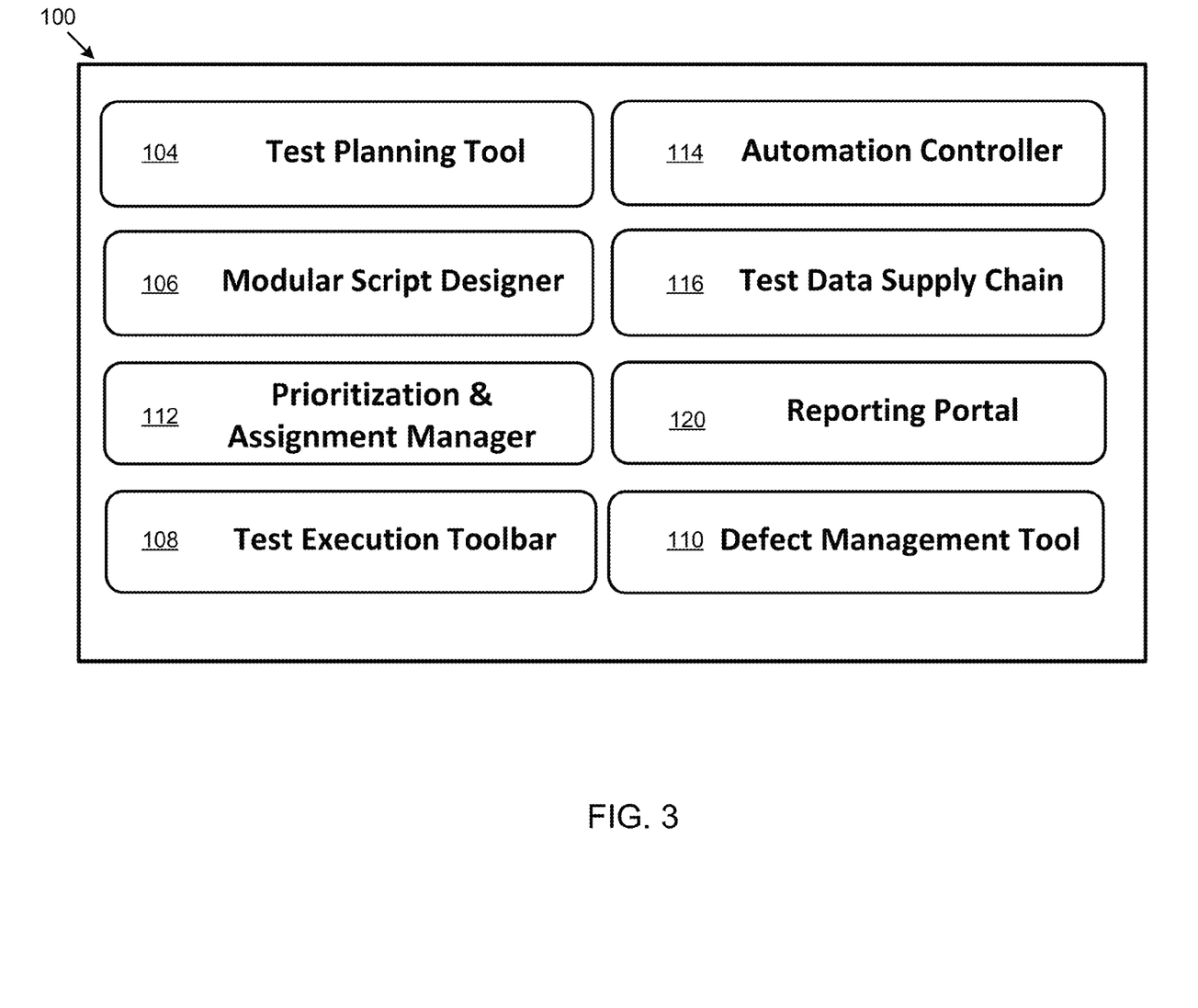
FIG. 3 is a diagram of key components of the NGT system.

FIG. 3 shows a diagram of key components of the NGT system 100. The key components may include a test planning tool 104, a modular script designer 106, a prioritization assignment manager 112, a test execution toolbar 108, an automation controller 114, a test data supply chain 116, a reporting portal 120, and defect management tool 110.

The NGT system 100 may be embodied as a system cooperating with computer hardware components and/or as computer-implemented methods. The NGT system 100 may include a plurality of software components or subsystems. The components or subsystems, such as the modular script designer 106 and the automation controller 114, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

Figure 4:
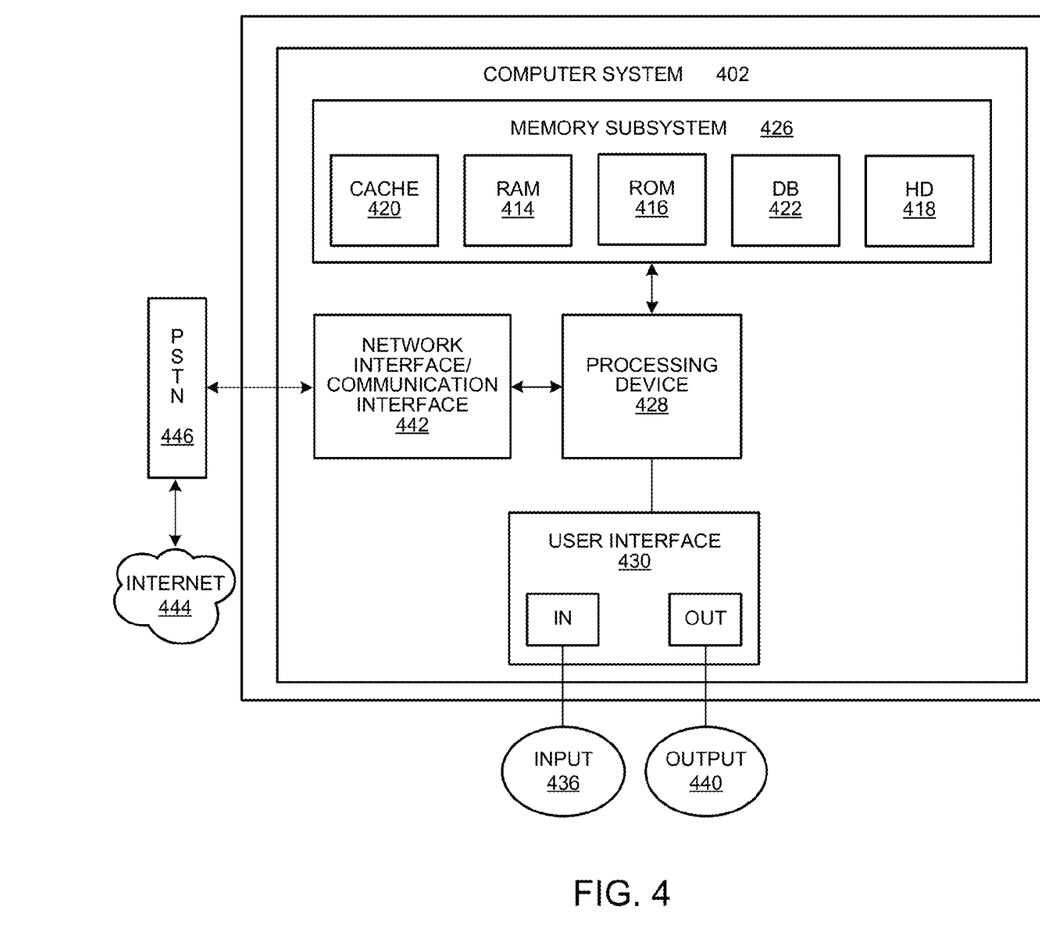
FIG. 4 is a high-level hardware block diagram of one embodiment of the NGT system.

FIG. 4 is a high-level hardware block diagram of one embodiment of the NGT system 100. The NGT system 100 may include a computer system 402, which may be a personal computer and may include various hardware components, such as RAM 414, ROM 416, hard disk storage 418, cache memory 420, database storage 422, and the like (also referred to as "memory subsystem 426"). The computer 402 may include any suitable processing device 428, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 428 may be an Intel Core i7® microprocessor, x86 compatible microprocessor, or equivalent device, and may be incorporated into a server, a personal computer, or any suitable computing platform.

The memory subsystem 426 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 430 may be coupled to the computer 402 and may include various input devices 436, such as switches selectable by the system manager and/or a keyboard. The user interface also may include suitable output devices 440, such as an LCD display, a CRT, various LED indicators, a printer, and/or a speech output device, as is known in the art.

To facilitate communication between the computer 402 and external sources, a communication interface 442 may be operatively coupled to the computer system. The communication interface 442 may be, for example, a local area network, such as an Ethernet network, intranet, Internet, or other suitable network 444. The communication interface 442 may also be connected to a public switched telephone network (PSTN) 446 or POTS (plain old telephone system), which may facilitate communication via the Internet 444. Any suitable commercially-available communication device or network may be used.

Description of the modular script designer 106 follows. Modular script designer 106 combines a simple, or facilitating script creation, using a modular approach along with an approvals framework. Modularization is the process of grouping test steps into small modules that describe a piece of functionality. These modules combine together to form test scripts or cases. The MSD 106 provides intelligent module suggestions for developing test scripts. Test scripts may include one or more modules. When a module is added to a script, a list of likely 'next modules' is displayed to the user. Therefore, the modular script designer 106 may improve knowledge management and decrease duplicated efforts in creating modules. Users can also search for modules with an in-line search function.

The modular script designer 106 also allows for meta-tagging and indicating parameters in the modules. Metadata is added to modules so that the system can understand how and where the module is used. Input and output parameters are specified to enable re-use of the modules and data-driven approaches. The modular script designer 106 also allows the specification of skills and pre-requisites associated with a module. Skills are assigned to the tests so that the system knows who will be able or qualified to execute the script. Pre-requisites (including data) are specified to track the readiness of a test for execution. The modular script designer 106 also provides automated approvals workflow. A centralized workflow system is used to enable modules to be approved or rejected. After a module is created or modified, the approver is notified. The approver may choose to approve the module to be used in all scripts, for a subset of scripts, or for a single script.

Description of the test execution toolbar 108 follows. The test execution toolbar 108 may be a unified toolbar incorporating all of the tools that a tester requires. The test execution toolbar 108 may provide in-line test execution. Test scripts can be opened directly within the toolbar, which saves room on a tester's desktop and avoids certain keystrokes, such as ALT-Tabbing, between screens. Defect raising and screen capture may be part of the process. The text execution toolbar 108 may also provide an embedded approvals lists. All module/script approvals may be shown in the toolbar, and an approver can quickly open the relevant script/module for approval. The test execution toolbar 108 also allows quick access to all NGT tools. A quick launch bar may be provided to enable the tester to quickly access all of the NGT tools. The toolbar may also handle login management for NGT. A user profile section is available to change user information. The test execution toolbar 108 is also dockable with an auto-hide function. The test execution toolbar 108 may be docked to the left hand side of the screen, and it can be selected to be visible or auto-hide. An extendable framework allows additional panels to be added to the toolbar.

Description of the prioritization and assignment manager ("PAM") 112 follows. The PAM 112 provides a centralized automated prioritization of test scripts with real-time assignment logic. The PAM 112 provides configurable prioritization factors. test scripts are prioritized based on a centralized set of factors, and the factors can be configured centrally to influence the entire test operation (for example, to improve performance against contractual key performance indicators ("KPIs")). The PAM 112 further provides a skill based assignment—it provides a pull, rather than push, approach. Testers may click 'Get Next' via a user interface to get assigned the next script to execute. The best script is chosen in real-time based on weighted assignment factors. Managers may control the skills as compared against the skills of their team members. The PAM 112 may also provide manager overrides. Managers are given a view of the scripts planned for execution by their team. They are able to change the factors of specific scripts (for example, business priority) to re-prioritize the queue and force scripts to be assigned to specific individuals. The PAM 112 may also provide a pluggable framework for new factors. New decision factors can be added by defining a new factor class. The factor may be presented through the user interface and can be weighted in the decision logic. This could be used to enable advanced 'Applied Statistic' decision models.

Description of the automation controller 114 follows. The automation controller 114 may be an automation framework for resilient off-line automation on a virtual farm, such as a computing machine in a "cloud environment." The automation controller 114 facilitates remote execution of test scripts. An automation controller agent may run on virtual machines ("VM's") to manage the execution of test scripts. A logging framework is used to support the execution. The automation controller 114 also may communicate with the PAM 112 to get the next script. This allows the centralized factors to apply to both manual and automated execution.

The automation controller 114 provides intelligent selection of test modules to maximize the "return on investment" or "ROI" associated with each test script that is run automatically. The automation controller 114 selects for automation the test scripts that provide the greatest ROI, collectively. The choice whether to automate a particular test script using the automation controller 114 may be based on the ROI associated with the test script. For example, a particular test script may be a test script that handles initial login by a user. Because a test script that handles initial login by user may be used by hundreds of different test scripts without variation, this testing script provides a high ROI, and as such, may be a good candidate for automation. The ROI is a measure of increased efficiency attained by automation of the test script. A prioritization workflow aids the automation team in assessing the next module to be automated. The user interface 430 allows the automation team to 'check-in' and 'upgrade' automated modules.

The automation controller 114 further provides modular design and partial automation, in certain embodiments. Automation scripts may be developed as modules, and each automation module may have one or more manual modules mapped against it. Partial automation enables rapid execution of automated parts of scripts. The automation controller 114 is used where applicable to automate the execution of test scripts.

Description of the reporting portal 120 follows. The reporting portal 120 provides an automated reporting capability accessible through a central on-line portal. The reporting portal 120 may include a full Microsoft™ Business Intelligence ("BI") suite. The solution makes use of SQL Server Integration Services, SQL Server Analysis Services and SQL Server Reporting Services, which are available from Microsoft Corporation. A custom SQL Server Integration Services (SSIS) component directly communicates with external testing tools 130 such as an HP Quality Center™ which is available from Hewlett-Packard Corporation.

The reporting portal 120 also includes an off-line data warehouse to avoid testing tool degradation. An off-line data warehouse may be maintained to avoid queries directly on the external testing tool. A dimension based data model is used for simplified reporting. Further, data is pre-aggregated in a multidimensional online analytical processing ("MOLAP") database to provide quick analysis.

The reporting portal 120 further provides cube-based metrics and KPIs (key process indicators). Using SS Analysis Services, measures and targets may have been pre-defined, which can be included into reports. PowerPivot, a spreadsheet add-in available from Microsoft Corporation, allows data to be quickly analyzed in spreadsheet programs, such as Microsoft Excel™ for ad-hoc reports. Further, the reporting portal 120 provides integration with solutions, such as Microsoft SharePoint™. Where data from systems other than the HP Quality Center™ is required (for example, financial/production data), the solution can receive data from solutions, such as Microsoft SharePoint™. The SSIS component allows the solution to be easily extended to direct data sources where required.

Description of the defect management tool 110 follows. The defect management tool 110 may simplify the process for raising, tracking and updating defects. The defect management tool 110 may provide a defect watch list. Toolbar based list of defects with real-time Red, Amber or Green (RAG) status indicators may be provided. Red status indicates high risk or serious project issues, amber status indicates medium risk, and green status indicates low risk. The defect management tool 110 may allow quick access to full information of the defects to see the latest status. The defect management tool 110 may also provide in-line defect raising with test history. While executing a test through the toolbar, screenshots and test steps may be captured. When a defect is raised, this information is pre-populated in the defect. Screenshots and other attachments can be uploaded directly. The defect management tool 110, also reduces "alt-tab" operations. By including core defect management in the toolbar, the defect management tool 110 is able to reduce the need to "alt-tab" into an external testing system 130, such as the HP Quality Center™. The defect management tool 110 also enables automated un-blocking of scripts to further avoid time spent in the external testing system. The defect management tool 110 further provides team based views. Managers have a 'team view' to enable them to see the defects currently impacting their team with the relevant size and status.

Description of the test planning tool 104 follows. The test planning tool 104 provides an intelligent interface for estimating, planning, selecting regression and assigning prep work. The test planning tool 104 provides assisted estimation. A three stage process is used to provide estimation at increasing levels of accuracy. Information is used from previous testing releases to improve estimates. Pluggable architecture for client-specific calculations may be used. The test planning tool 104 also provides deconstruction of requirements into tests. The test planning tool 104 assists the user in breaking down requirements into a manageable number of tests. Collaborative working capabilities allow a 'divide and conquer' approach. The test planning tool 104 further provides resource forecasting by skill. Early foresight of skills required to support the testing activities is made possible, and graphical display of availability versus demand may be presented on the user interface. The test planning tool 104 further helps to shape the test organization by promoting cross-skilling. The test planning tool 104 also provides regression pack suggestions. Using a meta-data driven approach, the system will suggest an appropriate regression pack. Risk-based testing scores can be used to size the pack accordingly.

Description of the test data supply chain 116 follows. The test data supply chain 116 automates the demand management and supply of test data. The test data supply chain 116 may provide a data catalogue. Data types are modeled and stored in a database. The test data team can check data in and out of the catalogue. Also, rules can be specified to enable basic data mining. The test data supply chain 116 also provides mapping data to test scripts. During preparation, the data type required is selected against the script. Also, using the modular script designer 106, data parameters can be mapped directly to script parameters to allow automated assignment at run-time. The test data supply chain 116 further provides monitoring of 'stock levels' and re-ordering. The test data supply chain 116 can monitor demand versus capacity for all types of data, and as data gets 'used' by test scripts, the levels are updated. The test data supply chain 116 can order additional data from the data team or via an automated provision. The test data supply chain 116 may also be integrated with the PAM 112. The stock levels can be used during prioritization to avoid running scripts that do not have available test data or where stock levels are low.

For example, if fifty specific test scripts require input data type "A" and twenty-seven specific test scripts require input data type "B," the test data supply chain 116 organizes the required data types for each script and provides the data to the test script in a "just-in-time" manner to avoid redundancy and reduce complexity. Further, such test data may change throughout the lifecycle of the testing process based on the results of a particular test. Accordingly, the test data supply chain 116 tracks the required changes and updates the data sets required for the corresponding test scripts so that as the test scripts are being executed, up-to-date test data is available to the test script.

Figure 5:
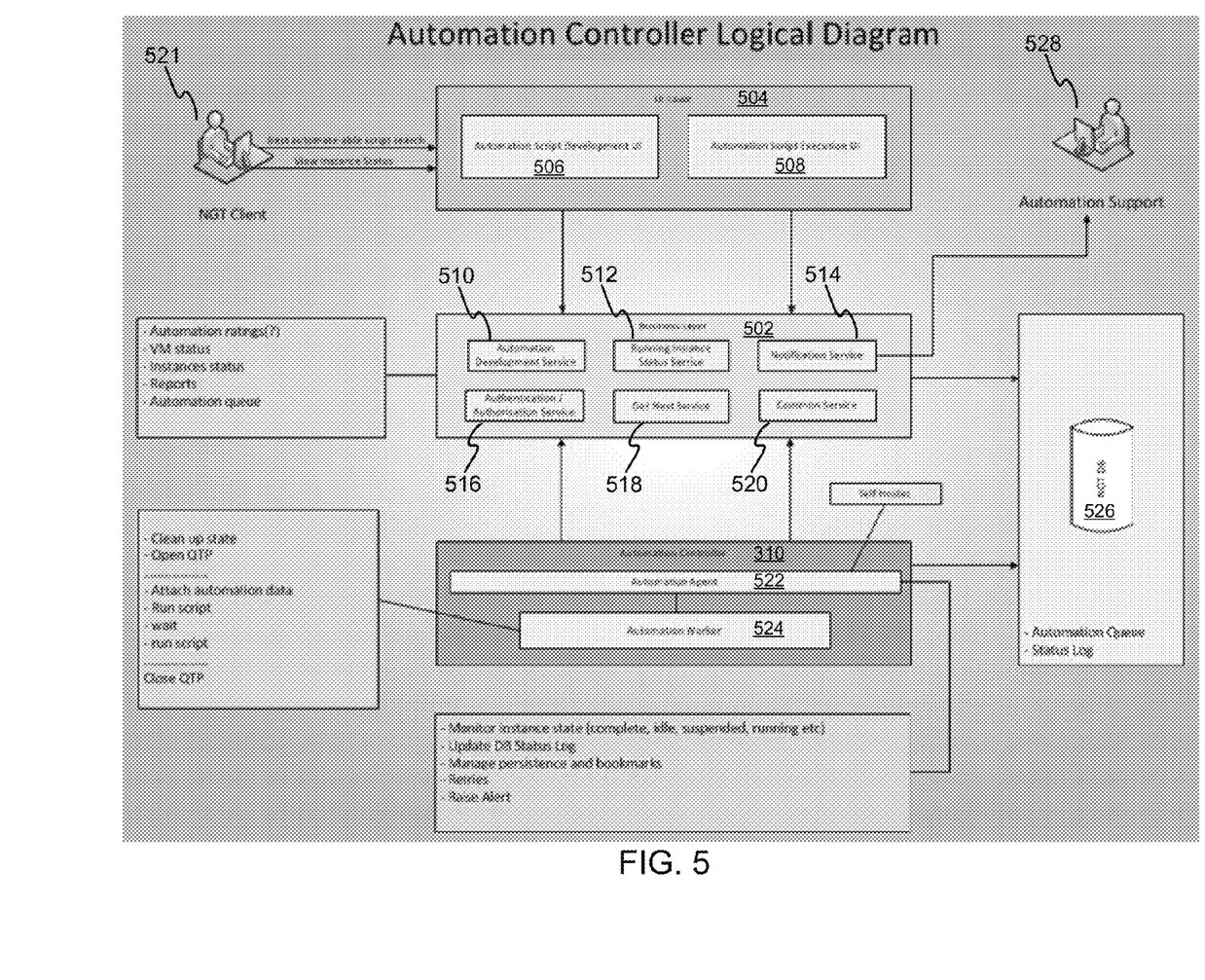
FIG. 5 is a logical diagram of the automation controller ("AC").

FIG. 5 shows a logical diagram of an embodiment of the automation controller ("AC") 114. The automation controller 114 may interact with a business layer 502, which also interacts with a user interface ("UI") layer 504. The user interface layer 504 may include an automation script development user interface ("UI") 506 and an automation script execution UI 508. The business layer may 502 include an automation development service 510, a running instance status service 512, a notification service 514, an authentication/authorization service 516, a get next service 518, and a common service 520. The automation development service 510 may be used for searching, creating, maintaining, configuring, persisting and queuing the automation scripts. The running instance status service 512 may be an application service configured to support execution status view, search and persistence. The notification service 514 may be a remote application service to alert user when exception occurs. The authentication/authorization service 516 may be an application service to authenticate a user and provide isolation depending upon user's profile. The Get next service 518 may be a service that provides the next candidate script for execution based on following rules: Immediate Execution and Delayed Till Execution (if at the time of request, the delay time has exceeded, the script becomes a high priority). Common service 520 may include a set of common services such as exception handling, logging, emailing, etc. The business layer 502 and automation controller 114 may interact with the NGT database 150. A user or NGT client 521 may use the UI layer to search for an automatable script or view instance statuses.

The automation controller 114 may include two components, an automation agent 522 and an automation worker 524. The automation agent 522 may be developed using Windows Workflow Foundation™ 4.0. The automation agent 522 may enable the PAM 130 to manage and host the Workflow run time, control, manage and report on running instances of automation workers 524. The automation agent 522 may communicate with NGT application database or server 526 to get the next script for execution by calling an NGT Get Next Service. The NGT Get Next service cleans PC state, gets an automation script path, gets automation data, and transfers work to the automation worker. The automation agent 522 may also communicate with the NGT application database or server 526 to monitor instance states, including complete, idle, suspended, and running states. Other states may also be monitored.

The automation agent 522 may monitor instance states by monitoring logs output by the functional test automation tool 162 in the file system containing execution status and traces. The automation agent 522 may also parse the log file to determine the next block, or module, to be executed. The automation agent 522 may send a delaying instruction and persist the delaying instruction into the automation queue stored on the NGT database 526. The delaying instruction may be a message that instructs the automation controller 114 to pause execution of a test script, store information about the block at which execution paused, forward the test script back to the prioritization and assignment manager for a predetermined period of time delay, and, after the time delay expires, allow continued execution of the test script from the block at which execution paused. While execution of the test script is paused, another test script may be executed. The parsing process may occur throughout execution of an automation script, or at the completion of execution of the automation script, by the automation worker and the functional test automation tool 162. The automation agent 522 may also manage persistence and bookmarks and update the NGT database 526 status log by persisting, or storing or maintaining, relevant contents of the log files into the NGT database 526. Additionally, the automation agent 522 may raise alerts, for example, by sending an alert message to the automation support staff 528 via the NGT application service, when exceptions are captured via the automation worker 524 log or in the run time environment itself.

The automation worker 524 may have multiple roles, including waiting for instructions from the automation agent 114. For example, then the automation worker 524 receives execution instructions and details from the automation agent 522, the automation worker 524 may launch the functional test automation tool 162, open a script via the functional test automation tool from the test management tool 130, add data to the functional test automation tool 162 (and add elsewhere when mentioned if accurate) data table, and run scripts and choose the results path. The automation worker 524 may also capture exceptions and inform the automation agent 522 when exceptions occur. The automation worker 524 may also inform the automation agent 522 when execution of a script is completed, faulted, cancelled, or another status, by raising internal events, which helps the automation agent 522 decide when to perform the next Get Next action.

Operational support of the automation controller 114114 may include deployment and rebooting of virtual machines. The automation controller 522 may be deployed manually on virtual machines using a .msi file generated using Microsoft's Visual Studio Team System 2010, which is a commercially available computer application. This option for deployment may require no additional configuration, but updates may require increased support. The automation controller 522 may also be deployed using Microsoft's ClickOnce, which is another commercially available computer application. This option for deployment reduces the support requirement by enabling automatic updates after the first installation. Clients may need to allow automatic update, which may require a user to login as an administrative user.

Rebooting of virtual machines 160 may involve a virtual network computing ("VNC") based configuration operated at a client to maximize the hardware usage. For example, each virtual machine may be allocated to three administrative users with separate logins. When the virtual machines are rebooted because of operational or maintenance needs, the automation controller 114 may instantiate, or create a real instance of, the automation agent 522 at the start of the console session during the reboot; remotely log into two additional sessions at the start up; and start an instance of the automation agent 522 at the startup on remote machines.

Components in the automation controller 114 may communicate, using a functional test automation tool 162, to automation agent workflow, which may be a predefined flat file format for passing information between a functional test automation tool session and workflow. The file format may include information such as the next section to run and the delay time till next execution.

Figure 6:
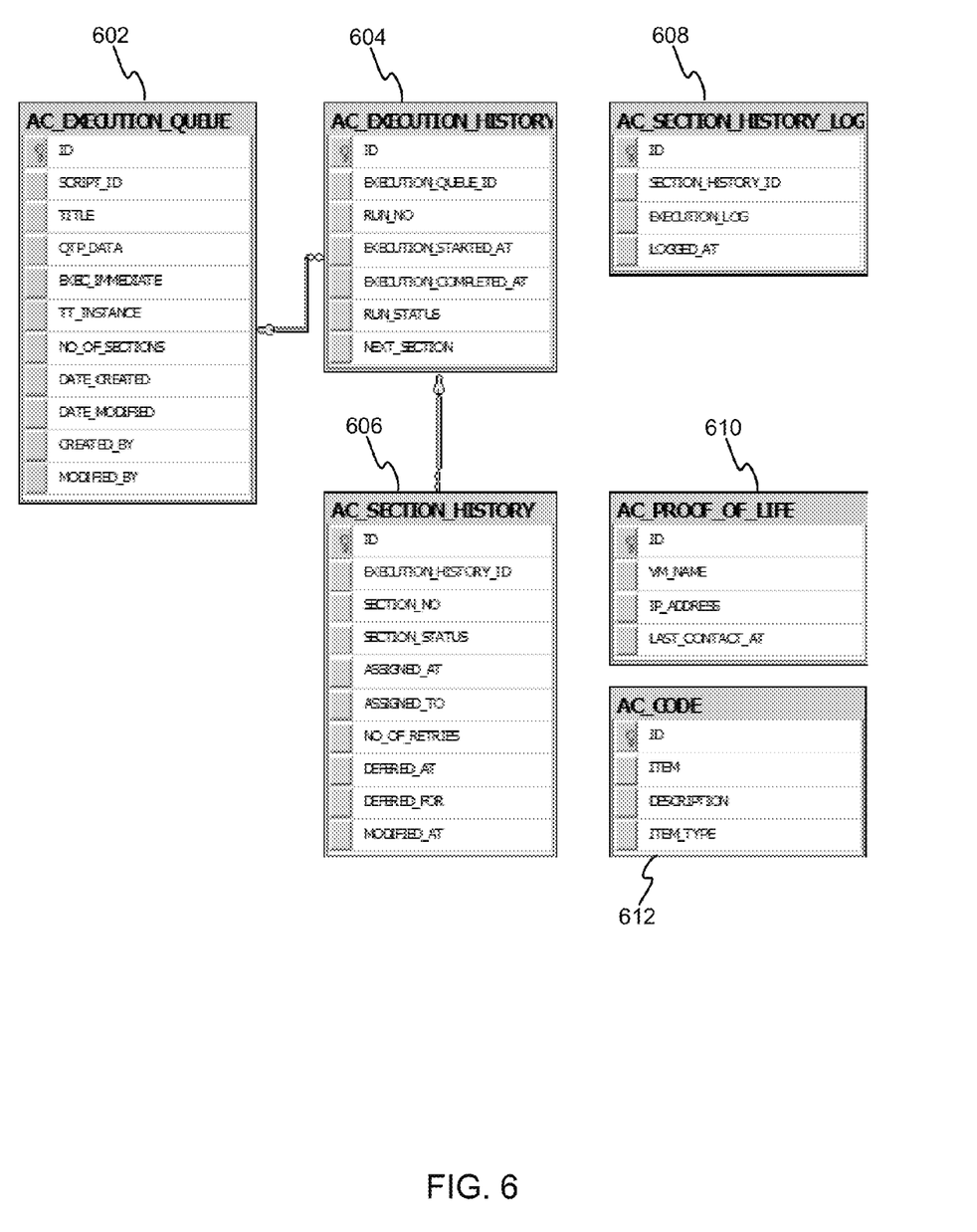
FIG. 6 shows examples of a key database table in an embodiment of the automation controller.

FIG. 6 shows key database tables which may be used by the automation controller 114. The key database tables used by the automation controller 114 may include: an execution queue data table 602, an execution history data table 604, a section history data table 606, a section history log data table 608, proof of life data table 610, and a code data table 612. The following tables include data that may be stored in the key database tables, the data type or format, and a description of the data. Other implementations of the automation controller 114 may use different, additional or other data or variables.

Table of Variables for Automation Controller Execution Queue

| Variable Name | Data Type | Description |
| --- | --- | --- |
| ID | AUTO | This column is a unique identifier for the Execution Queue row, and may be automatically generated by incrementing to a next integer when a new row is added to the database table |

-continued

Table of Variables for Automation Controller Execution Queue

| Variable Name | Data Type | Description |
| --- | --- | --- |
| SCRIPT_ID | Integer | This column stores the reference to the test script ID in a separate Scripts database table |
| TITLE | nvarchar(50) | The title of the script in the execution queue |
| QTP_DATA | nvarchar (MAX) | This column is representative to demonstrate that the execution queue database table captures the data that needs to be inserted into a functional test automation tool, such as QTP, the format of which may or may not be limited to this data type. |
| EXEC_IMMEDIATE | bit | TRUE or FALSE; true indicates that the script is ready to run provided status in AC_EXECUTION_STATUS is unassigned. |
| TT_INSTANCE | Integer | The instance of the Test Tool which the script will be executed by |
| NO_OF_SECTIONS | Integer | No of entry points in the script. Each is called in a separate QTP session. |
| DATE_CREATED | datetime | The date and/or time when the row is entered into the queue |
| DATE_MODIFIED | datetime | The date and/or time when the row is modified by any action. |
| CREATED_BY | nvarchar(25) | A record of who added this row into the execution queue/database table |
| MODIFIED_BY | nvarchar(25) | A record of who most recently modified this row in the execution queue/database table |

Table of Variables for Automation Controller Execution History

| Variable Name | Data Type | Description |
| --- | --- | --- |
| ID | AUTO | This column is a unique identifier for the Execution History row |
| EXECUTION_QUEUE_ID | Integer | This column is a reference pointer into the Execution queue database table |
| RUN_NO | Integer | increments this number in a new row each time this script is scheduled to run again |
| EXECUTION_STARTED_AT | Datetime | Start of the run |
| EXECUTION_COMPLETED_AT | Datetime | End of the run, only if successful |
| RUN_STATUS | nvarchar(50) | indicates the current run status e.g. IN-PROGRESS, FAILED or COMPLETED |
| NEXT_SECTION | Integer | Next section scheduled for execution |

Table of Variables for Automation Controller Section History

| Variable Name | Data Type | Description |
| --- | --- | --- |
| ID | AUTO | This column is a unique identifier for the Section row |
| EXECUTION_HISTORY_ID | Integer | This column is a reference pointer into the Execution queue History database table |

-continued

Table of Variables for Automation Controller Section History

| Variable Name | Data Type | Description |
|---|---|---|
| SECTION_NO | Integer | Reference to the automated script code block this row is associated with |
| SECTION_STATUS | Integer | UN-ASSIGNED, IN-EXECUTION, DEFERED, FAILED, COMPLETED, RETRY |
| ASSIGNED_AT | Datetime | time of assignment |
| ASSIGNED_TO | Nvarchar(25) | VM host name |
| NO_OF_RETRIES | Integer | A count of the number of attempts the automation controller has made to run this block of the test automation script |
| DEFERED_AT | datetime | Some scripts need multiple runs and between each run there can be a delay. This columns helps to support the logic to calculate whether delay has expired when read with DEFERED_FOR integer value |
| DEFERED_FOR | Integer | Waiting duration in minutes from DEFERED_AT datetime before script execution |
| MODIFIED_AT | datetime | The date and/or time when this database row was last updated |

Table of Variables for Automation Controller Section History Log

| Variable Name | Data Type | Description |
|---|---|---|
| ID | AUTO | This column is a unique identifier for the Section History row |
| SECTION_HISTORY_ID | Integer | This column is a reference pointer into the Section History database table |
| EXECUTION_LOG | nvarchar(MAX) | A text based comment logging a notable event related to the execution of a section or block within the automation script |
| LOGGED_AT | datetime | The date and/or time when the log entry is made |

Table of Variables for Automation Controller Proof of Life

| Variable Name | Data Type | Description |
|---|---|---|
| ID | AUTO | This column is a unique identifier for the Proof of Life database row |
| VM_NAME | nvarchar(50) | The given name to identify a Virtual Machine on which an automation controller system component is hosted |
| IP_ADDRESS | nvarchar(25) | The IP (internet protocol) address of the Virtual Machine |
| LAST_CONTACT_AT | datetime | Last time VM logged its status. |

Test automation provided by the automation controller 114 may take place on the Virtual Machines ("VMs"). Each VM 160 may have an instance of functional test automation tool 162 installed along with a small service-based application to poll for the next task to execute. The service will call the PAM 112 to get the next test to be executed, load that test in the functional test automation tool 162, run the test, record the results and then ask for the next test. The automation controller 114 may include four types of features, "Get Next Script", "Script Generation", "Script Execution", and "Resilience". The Get Next Script feature allows a service to be deployed to the VMs and calls a central Web Service to get the next script, which returns a set of input variables and a list of modules to be executed. The Script Generation feature creates a script to be loaded into the functional test automation tool 162 for execution. The Script Execution feature runs the script in the functional test automation tool 162 and records the results. The resilience feature allows the service to be resilient to errors occurring during execution (e.g. the functional test automation tool 162 freezing, etc.) and recover from these situations automatically.

The automation controller 114 may automate script design at a modular level with a one-to-one mapping between manual modules and automated modules. For example, a test script "X" may include one or more modules. When the script "X" has modules that are all automatable, the NGT system 100 sends the script to the automation controller 114 for testing. The automation controller 114 may then distribute the scripts to VMs to run the scripts unattended.

The NGT system 100 may include UIs which may provide in-line automation of modules in a toolbar. For example, when a script has a combination of manual modules and automated modules, the NGT system 100 may assign the script to a tester. The automation controller 114 may include, in a toolbar, an icon to indicate that a module is an automated module. The tester may click on the icon to automate that module on the tester's desktop.

The automation controller 114 may provide a feature to get scripts that will produce the highest return on investment ("RoI") when automated. The NGT system 100 may determine how a high RoI may be achieved by analyzing the modules in the system. For example, the system 100 may look for modules which are included in the most scripts, or look for scripts which include the highest number of automated modules. Based on these and other factors, the system 100 may determine which scripts or modules, when automated and run by the automation controller 114 will return the highest RoI.

Figure 7:
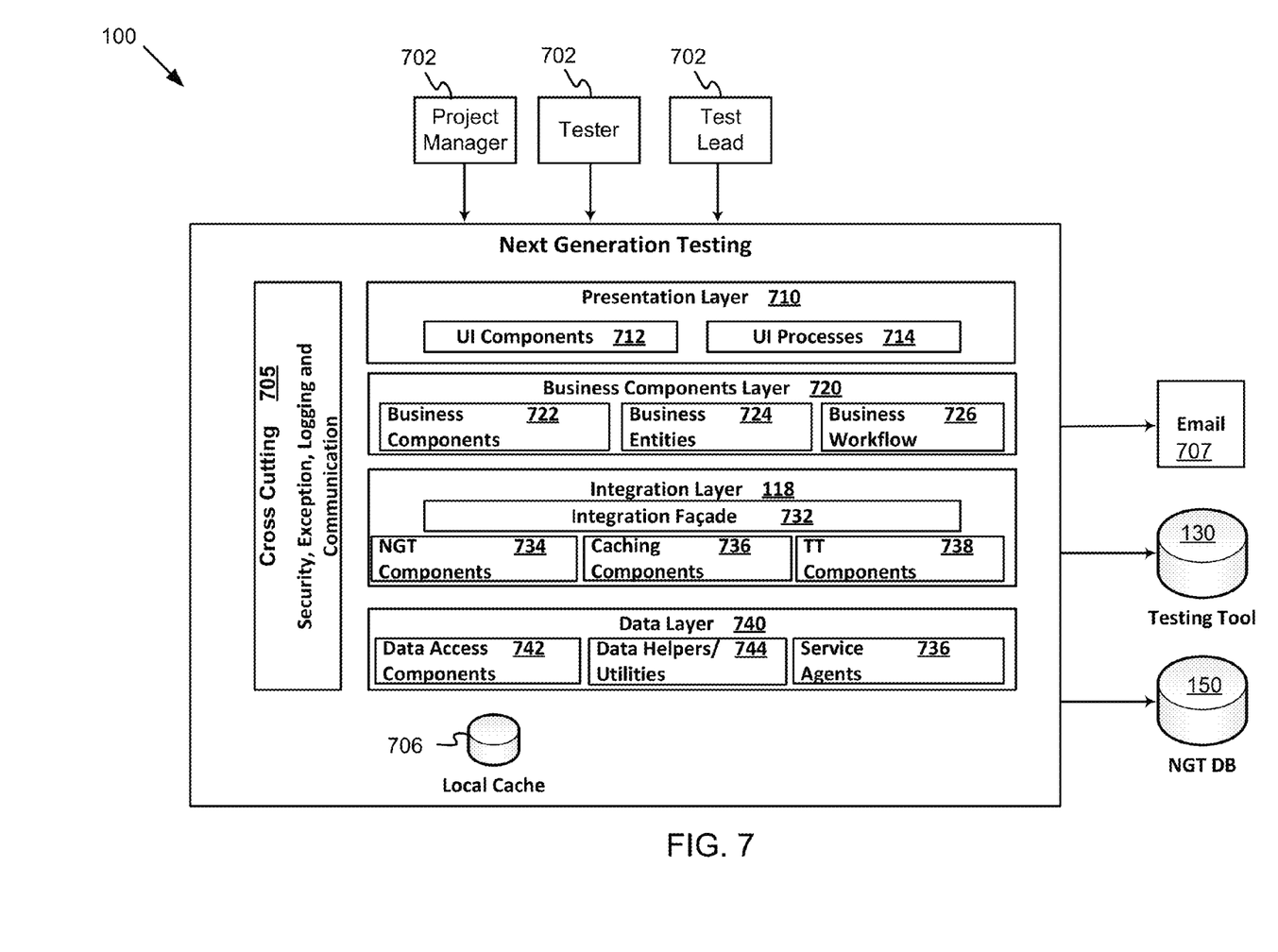
FIG. 7 is a conceptual diagram of an embodiment of the NGT system.

FIG. 7 shows a conceptual diagram of an embodiment of the NGT system 100. As shown in FIG. 7, the NGT system 100 may include a presentation layer 710, a business component layer 720, an integration layer 118, and a data layer 740. The presentation layer 710 includes user interface (UI) components 712 which render and format data for display to users 702, including project managers, testers, and test leads, and acquire and validate data that users 702 enter. The presentation layer 710 also includes UI process components 714 that drive the process using separate user process components to avoid hard coding the process flow and state management logic in the UI elements themselves. The business components layer 720 implements business logic and workflow. The business components layer 720 includes business components 722 which implement the business logic of the application. The business components layer 720 also includes business entities 724 and business workflow 726. Business entities are data transfer objects in the business components layer 720. These are common objects that can be used across the layers, including the presentation layer 710, to pass data around.

The integration layer 118 provides backend agnostic access to the upstream layers (business components layer 720 and presentation layer 710), and enables plug-ability via a common interface to one or more backend systems such as QC, Rational and Team Foundation Server. Integration layer 118 implements the following design pattern: an abstract base class inherits from ProvideBase, which is a class available in Microsoft's .NET; each concrete implementer in turn inherits from the abstract class above; Appropriated Provider is loaded based on type definition in a .config file. The integration layer 118 also includes the integration façade. Integration façade exposes a simplified interface to the business components layer 720, and reads data from a combination of data transfer objects from one or more backend repository or cache (R2) and merges them to a common super data transfer object to return to the business components layer 720. Integration layer 118 also includes NGT components 734 which interface between the integration façade 732 and the data layer 740 and may provide mapping functionality for the integration layer 118 if required. The integration layer 118 also includes caching components 736 and testing tool components 738. Testing tool components 738 are providers servicing requests for data read/write from a Testing Tool 704.

The data layer 740 includes data access components 742 which centralize the logic necessary to access underlying NGT data store, exposing methods to allow easier and transparent access to the database. It also includes data helper/utilities 744 which are used to centralizing generic data access functionality such as managing database connections. The data layer 740 also includes service agents 736 which provide Windows Communication Foundation services proxy for talking to application server services. The data layer 740 may be an Enterprise Library Data Access Application Block or a custom designed data layer. Alternatively, object relational mapping tools, such as Entity Spaces (available from EntitySpaces, LLP), Genome (available from TechTalk, GmbH), LINQ-to-SQL (available from Microsoft Corporation), Entity Framework (also available from Microsoft Corporation), or LLBLGen Pro (available from Solutions Design), may be used to generate the data layer 740 components.

Cross cutting functions 705 in the NGT 100 may include, for example, security, exceptions handling, locking, and communication. The NGT 100 may also include a local cache 706. Outputs from the NGT 100 may include, for example, email functionality 707 or other information communication functionality. Emails may include notifications to testers regarding script rejection or approval, notifications to approvers regarding scripts that are ready for review, and notifications regarding security concerns, system exceptions, and auditing. The NGT 100 may also communicate information to testing tool 130 and an NGT database 150.

Figure 8:
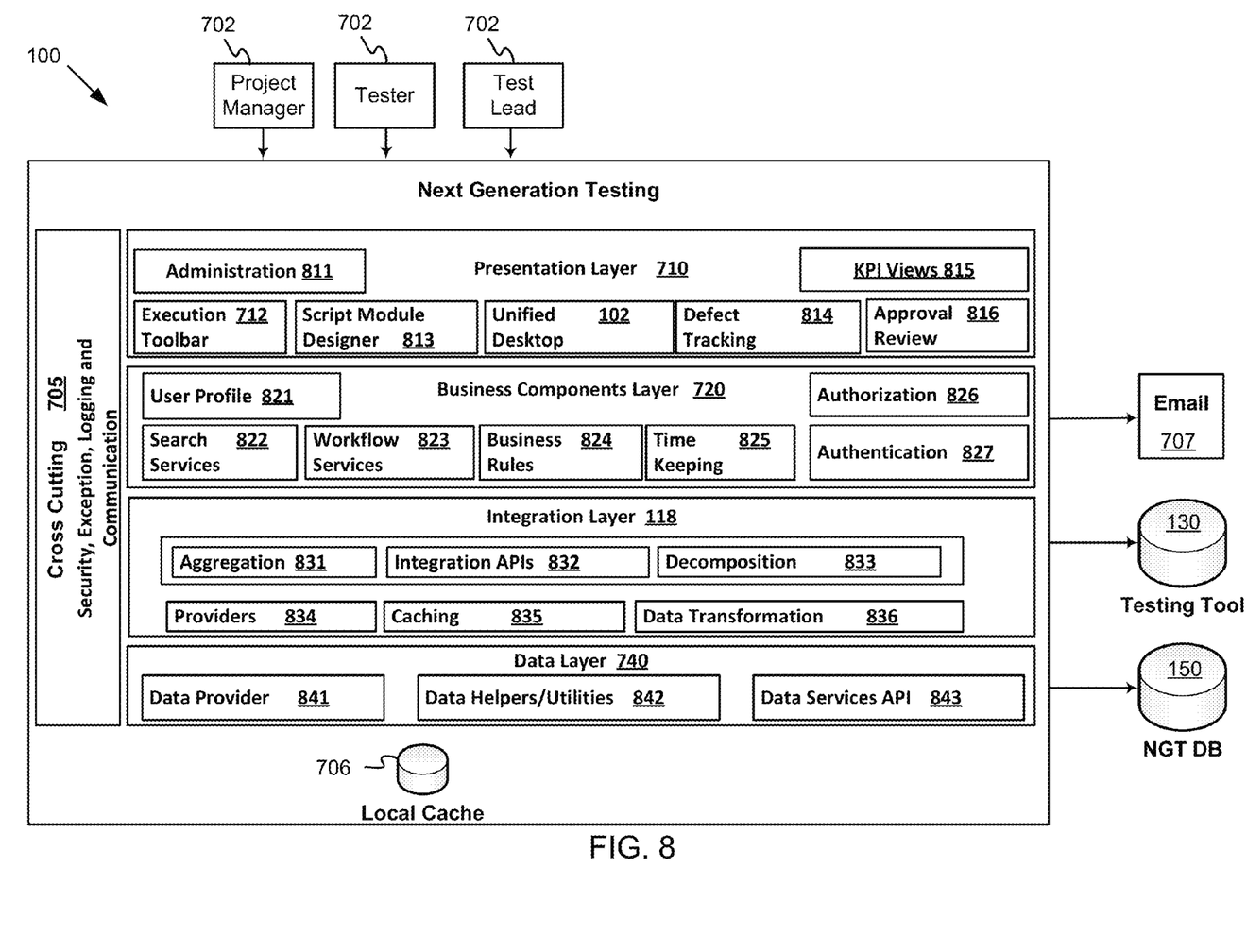
FIG. 8 is a logical diagram of an embodiment of the NGT system.

FIG. 8 shows a logical diagram of an embodiment of the NGT system 100. In the embodiment, the presentation layer 710 may include a plurality of UI components 712 and UI processes 714, including an administration interface 811, an execution toolbar 812, a script module designer 813, a unified desktop 102, a defect tracking interface 814, KPI views 815, and an approval review interface 816. The business components layer 720 may include a plurality of components, including a user profile component 821, a search services component 822, a workflow services component 823, a business rules component 824, a time keeping component 825, an authorisation component 826, and an authentication component 827. The integration layer 118 may include an integration façade 732, which may include aggregation 831, integration APIs 832, and decomposition 833. The integration layer 118 may also include providers 834, caching 835, and data transformation 835. The data layer 740 may provide access to a data provider 841, data helper/utilities 842, and data services API 843.

Figure 9:
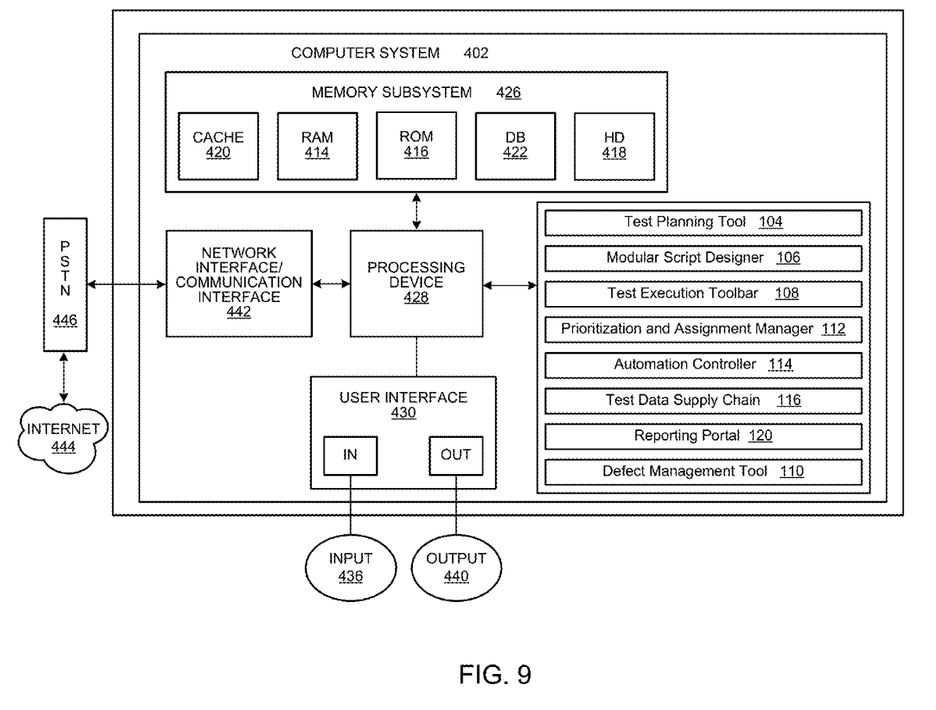
FIG. 9 is a high-level hardware block diagram of another embodiment of the NGT system.

FIG. 9 is a high-level hardware block diagram of another embodiment of the NGT system. The NGT system 100 and its key components 104, 106, 108, 114, 116, 120, and 110 may be embodied as a system cooperating with computer hardware components, such as a processing device 428, and/or as computer-implemented methods. The NGT system 100 may include a plurality of software components or subsystems. The components or subsystems, such as the test planning tool 104, the modular script designer 106, the prioritization and assignment manager 112, the test execution toolbar 108, the automation controller 114, the test data supply chain 116, the reporting portal 120, and/or the defect management tool 110, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan) and then compiled and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An automation controller for a next generation testing system comprising: a processor and a memory in communication with the processor;
   a database in communication with the processor including a plurality of scripts wherein each script comprises one module or more modules that combine to form the script and each module includes a grouping of steps and describes a piece of functionality of the script;
   a business layer component; and
   an automation component comprising an automation agent and an automation worker,
   wherein the business layer component determines a next script from the plurality of scripts based on a return on investment (RoI) of running the next script by:
      calculating the RoI of running a particular script from the plurality of scripts as the next script by analyzing a plurality of the modules of the particular script, said analyzing comprising identifying modules that are included in the most scripts, or identifying scripts that include a highest number of automated modules; and
      determining the next script based on the calculated RoI of running the particular script from the plurality of scripts;
   and transmits the next script to the automation component in response to a get next script request sent by the automation component,
   wherein the automation agent transmits the get next script request to the business layer, receives the next script from the business layer, and transmits the next script to the automation worker for execution, and
   wherein the automation worker executes the next script or section thereof, obtains a result, transmits status updates, transmits proof of life notifications, and transmits a result of execution to the automation agent.

2. The automation controller of claim 1, wherein analyzing the plurality of modules comprises determining a number of the plurality of scripts including a given module.

3. The automation controller of claim 1, wherein the business layer component is further configured to:
   calculate the RoI for developing an automation module or a script to determine where to divert development effort.

4. The automation controller of claim 1, wherein the business layer component further alerts a user if an exception occurs in executing the script.

5. A method for automating testing of modular scripts in a next generation testing system, the method comprising:
   receiving, at an automation controller, a plurality of scripts wherein each script comprises one or more modules that combine to form the script and each module includes a grouping of steps and describes a piece of functionality of the script, and wherein the automation controller comprises:
      a database configured to store the plurality of scripts and modules,
      a business layer component, and
      an automation component comprising an automation agent and an automation worker;
   determining, by the business layer component, a next script from the plurality of scripts based on a return on investment (RoI) of running the next script by:
      calculating the RoI of running a particular script from the plurality of scripts as the next script by analyzing a plurality of the modules of the particular script, said analyzing comprising identifying modules that are included in the most scripts, or identifying scripts that include a highest number of automated modules; and
      determining the next script based on the calculated RoI of running the particular script from the plurality of scripts;
   and sending the next script to the automation component in response to a get next script request sent by the automation component,
   wherein the automation agent sends the get next script request to the business layer, receives the next script from the business layer, and sends the next script to the automation worker for execution, and
   wherein the automation worker executes the next script or section thereof, obtains a result, transmits status updates, transmits proof of life notifications, and transmits the result of execution to the automation agent.

6. The method of claim 5, wherein analyzing the plurality of modules comprises determining a number of the plurality of scripts including a given module.

7. The method of claim 5, wherein the business layer component is further operable to:
   calculate the RoI for developing an automation module or a script to determine where to divert development effort.

8. The method of claim 5, wherein the business layer component further alerts a user if an exception occurs in executing the script.

9. A system for automating testing of modular scripts in a next generation testing system, the system comprising:
   a computer processor;
   a memory in communication with the computer processor, the memory comprising logic for an automation controller component, wherein the automation controller component comprises an automation agent and an automation worker and wherein the logic when executed by the computer processor causes the computer processor to:
   receive a plurality of scripts and modules wherein each script comprises one or more modules that combine to form the script and each module includes a grouping of steps and describes a piece of functionality of the script;
   store the plurality of scripts and modules in a database in the memory;
   determine a next script from the plurality of scripts based on a return on investment (RoI) of running the next script by:
      calculating the RoI of running a particular script from the plurality of scripts as the next script by analyzing a plurality of the modules of the particular script, said analyzing comprising identifying modules that are included in the most scripts, or identifying scripts that include a highest number of automated modules; and
      determining the next script based on the calculated RoI of running the particular script from the plurality of scripts;
   and transmit the next script to the automation controller component in response to a get next script request sent by the automation controller component;
   transmit the get next script request to a business layer;
   receive the next script from the business layer;
   transmit the next script to the automation worker for execution;
   execute, by the automation worker, the next script;
   obtain, from the automation worker, a result of the execution of the next script; and
   send status updates, proof of life notifications, and the result of the execution, to the automation agent.

10. The system of claim 9, wherein analyzing the plurality of modules comprises determining a number of the plurality of scripts including a given module.

11. The system of claim 9, wherein the computer processor further:
- calculates the RoI for developing an automation module or a script to determine where to divert development effort.

* * * * *